March 4, 1952
L. J. HAWORTH
2,588,114
CATHODE-RAY TUBE CIRCUIT
Filed May 25, 1944
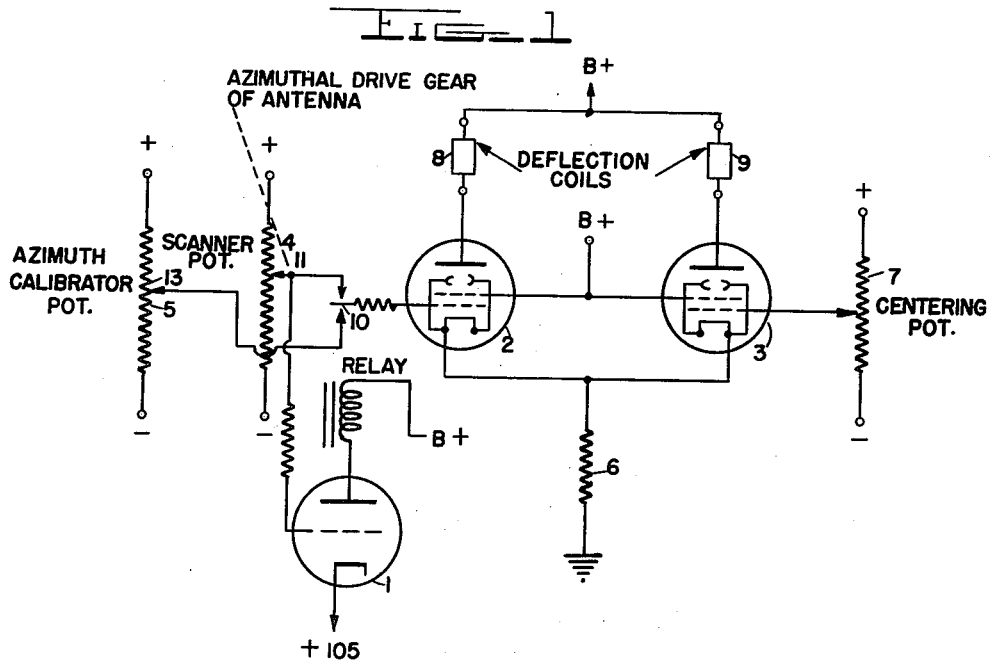
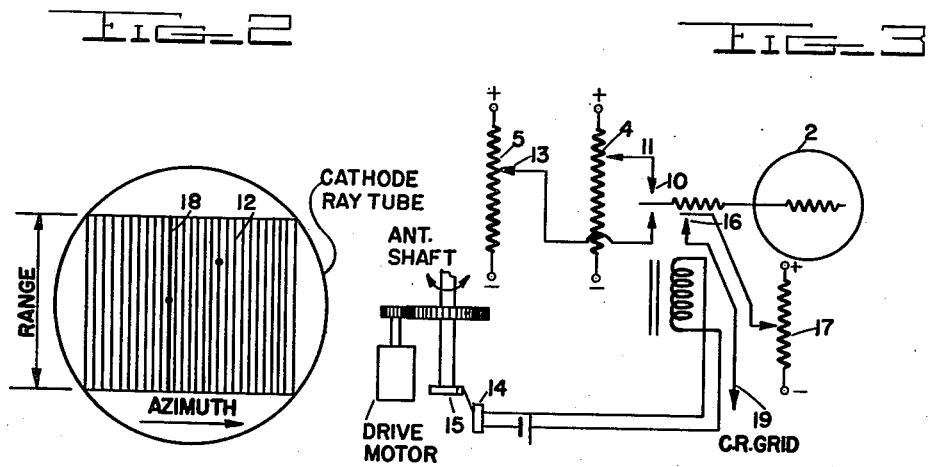
Inventor
LELAND J. HAWORTH Patented Mar. 4, 1952

2,588,114

UNITED STATES PATENT OFFICE 2,588,114

CATHODE-RAY TUBE CIRCUIT

Leland J. Haworth, Champaign, Ill., assignor, by mesne assignments, to the United States of America as represented by the Secretary of the Navy Application May 25, 1944, Serial No. 537,318

8 Claims. (Cl. 343—113)

1

This invention relates broadly to cathode ray tube indicator circuits for radio echo detection systems and more particularly to means for applying a movable azimuth marker line thereto.

There are certain types of radio detection systems which are adapted to indicate on a cathode ray tube both range and azimuth of an object. One type, for example, uses rectangular coordinates indicating range as a function of the vertical movement of the cathode ray beam and azimuth as a function of the horizontal movement of the beam, the latter being adapted to move synchronously with the azimuthal scanning of the antenna. In another type, a rotating radial sweep is used, synchronized with the rotation of the antenna and adapted to indicate range as a function of the radius of the sweep and azimuth as a function of the angular disposition of the sweep line relative to a given reference line. In either type it is often desired to expand a certain portion of the azimuth indication in order to indicate more accurately the bearing of the object. During the periods when a section of the scan is enlarged, more accurately to resolve a target indication, the electron beam of the tube is directed away from the face of the screen for a considerable period of the antenna scan, and the target indication may fade out before the recurrence of the next successive indication, thereby causing the operator of the system to lose track of the exact position of the indication on the screen. It is therefore desirable to provide a marker on the face of the tube which will indicate the position of the target during the interval between successive indications of the target itself.

It is therefore an object of this invention to provide on the indicator screen of a cathode ray tube a movable marker line which is indicative of the position of the object.

It is another object of this invention to automatically provide a movable marker on the indicator screen of the cathode ray tube in response to the movement of the antenna beyond predetermined limits, and which is indicative of the position of an object.

Other objects and features of the present invention will become apparent upon the careful consideration of the following detailed description when taken together with the accompanying drawings, the figures of which represent preferred embodiments of the invention.

Fig. 1 is a circuit diagram of one embodiment of the invention;

Fig. 2 is a schematic diagram showing one type of indication often used in radio echo detection systems, and Fig. 3 is a circuit diagram illustrating another embodiment of the invention.

Reference is now had to Fig. 1 wherein there is shown one embodiment of the invention adapted to produce a movable azimuth marker line on a cathode ray tube indicator which indicator is of the type arranged to indicate range as a function of the vertical movement of the cathode ray beam and azimuth as a function of the horizontal movement, as illustrated in Fig. 2. Tubes 2 and 3 are the usual push-pull drivers used for driving the horizontal deflection coils of a cathode ray tube indicator, the driving voltage for which is obtained from the adjustable arm 11 of the potentiometer 4 and applied to the control grid of tube 2. Across potentiometer 4 there is placed a steady but adjustable voltage, so as the antenna rotates in azimuth the adjustable arm 11 which is geared to the azimuth drive means of the antenna also moves causing a linear change in impressed grid voltage on tube 2 and hence a corresponding change in plate current therefrom. Potentiometer 4 is preferably of circular configuration and of uniform linear resistance. Positive and negative potentials with respect to ground of equal magnitude are applied to the respective ends of the potentiometer, thereby resulting in ground potential at the center of the potentiometer. The source of potentials (not shown) is so arranged that the magnitudes of the positive and negative voltages can be adjusted in identical increments, thereby maintaining the relationship of zero potential appearing at the center of the resistor. Any well-known network of voltage dividers and switches may be adapted to produce this type of voltage source. It is therefore apparent that when the arm of potentiometer 4 is at the center of the resistance, i. e., when the antenna is at the center of scan, no signal will be applied to tube 2, and the scan pattern will be approximately centered on the face of the tube. The importance of having the center of the potentiometer at zero potential with increased potentials at the terminals will hereinafter more clearly appear. Since the cathode resistor 6 is common to both tube 2 and 3, a change in plate current from tube 2 will cause an inverse change in grid voltage on tube 3. Hence, a true push-pull driving source for the azimuth deflection coils 8 and 9 of the cathode ray tube indicator is obtained. To accurately center the indication on the cathode ray tube to correspond to the center of the antenna scan and to overcome slight discrepancies in circuit constants, a centering potentiometer 7 is provided, connected to the control grid of tube 3 and across which a steady voltage is supplied. Thus, as potentiometer 7 is adjusted to change the bias of tube 3 and consequently the bias of tube 2 due to the common cathode resistance 6, the centering of the presentation on the cathode ray tube indicator is correspondingly adjusted.

In normal search use of the radio echo detection system, it is unnecessary to provide a target marker since the electron beam of the cathode ray tube presentation always appears on the face of the tube. The voltages applied to the ends of potentiometer 4 are such that as the antenna rotates, the electron beam is deflected to just cover the face of the tube. During this type of operation, the potential at arm 11, and accordingly on the grid of tube 1, never reaches a value when tube 1 will conduct. When it is desired to expand the azimuth view, i. e., enlarge a sector of the scan for better resolution, it is necessary to impress a larger voltage on the horizontal deflection plates of the cathode ray tube to cause the electron beam to move across the entire width of the tube during a shorter period of time. This increased voltage is provided by increasing the positive and negative potentials at the respective ends of potentiometer 4 in the manner hereinabove described, thereby causing a greater voltage gradient across the potentiometer and a consequent greater amount of beam deflection for each unit of movement of the antenna. Since the lower voltage used for search use of the system caused the electron beam to scan the entire width of the tube, it will be apparent that with this increase in voltage and the consequent greater deflection, the electron beam will be deflected beyond the screen during part of the antenna scan. It is during this period that it is desirable to provide a marker to indicate the target position. This marker is produced as follows: Tube 1 is biased such that when arm 11 approaches the positive end of potentiometer 4, the voltage on the grid of tube 1 is sufficient to cause the tube to conduct. The increase in current through tube 1 causes relay 10 to operate, thereby disconnecting arm 11 from the grid of tube 2 and connecting the movable arm 13 of azimuth calibrator potentiometer 5 to said grid. Fixed positive and negative potentials are applied to the respective ends of potentiometer 5 as indicated. It is therefore apparent that when the relay 10 is caused to operate, a fixed grid voltage, determined by the position of arm 13 of potentiometer 5, is applied to the control element of tube 2, thereby causing the electron beam to remain stationary at a particular azimuth position on the face of the cathode ray tube, as indicated by the solid line 18 of Fig. 2. This line will appear in a fixed position on the screen of the tube as long as the relay 10 is closed, i. e., as long as the potential on the grid of tube 1 is high enough to cause it to conduct. During this period, the movable arm 13 of potentiometer 5 is hand adjusted by a hand wheel or other suitable means (not shown), to move the line 18 to any desired position on the face of the tube. The rather long persistence of cathode ray tubes used in radio echo detection system permits the adjustment of potentiometer 5 such that the line 18 (Fig. 2) corresponds in azimuth to the target indication which appeared in the expanded region of the previous scan. When tube 1 again becomes non-conducting, the electron beam will again be controlled by the scanner potentiometer 4, but the persistence of the screen will cause the line 18 to indicate the azimuthal position of the target until a new indication appears on the screen. By the foregoing technique, the operator of the system can maintain a close watch of the azimuth location of target indications.

As mentioned above, while using an expanded sweep, the positive and negative potentials applied to the ends of resistance 4 are increased by equal amounts over the values applied in search use. The voltage gradient across the resistor has been increased, but the center of the potentiometer is still at zero potential with respect to the ground. In the event that the expanded sweep does not appear about the center of the antenna scan, however, potentiometer 7 may be adjusted to center the presentation on the face of the cathode ray tube.

An alternate and simpler means by which the azimuth calibrator potentiometer 5 may be connected to the grid of tube 2 when the radiating beam of the antenna is not scanning the target may be obtained by the cam 15 and switch 14 arrangement shown in Fig. 3. In this arrangement the switch 14 is closed by the cam 15 whenever the antenna rotates beyond certain predetermined limits, thus energizing the relay 10 to interchange the connections of potentiometers 4 and 5 to the grid of tube 2. This same relay is also adapted to close the contact 16 thereby connecting the grid of the cathode ray tube through lead 19 to an adjustable bias supply which is obtained from potentiometer 17. This bias is so adjusted as to illuminate the electron beam of the cathode ray tube; thus, a vertical line corresponding in width to the electron beam, such as that shown at 18 in Fig. 2, or a stationary radial line, if the rotating radial sweep type indication is used, will be seen on the screen of the cathode ray tube indicator at an azimuth position determined by the setting of potentiometer 5. In operational use this line is adjusted to coincide with the azimuth position of the desired object so that the operator may keep track of the object even though the antenna may not be looking at it.

Although I have shown and described only certain and specific embodiments, I am fully aware of the many modifications possible thereof. Therefore this invention is not to be limited except insofar as is necessitated by the prior art and the spirit of the appended claims.

What is claimed is:

1. In a radio echo detection system indicator circuit, which includes a cathode ray tube indicator and a push-pull driver stage adapted to deflect the electron beam of said cathode ray tube horizontally in accordance with the azimuth rotation of the antenna of said system, apparatus for producing a movable azimuth marker line comprising, a first potentiometer having a movable arm which is adapted to follow the azimuthal rotation of said antenna and to supply said driver stage with an input signal, a second potentiometer, a thermionic tube having at least a plate, a cathode, and a control grid, said control grid being connected to said arm of said first potentiometer, and a relay connected in the plate circuit of said tube being adapted to change the input to said driver stage from said first potentiometer to said second potentiometer whenever the output from said first potentiometer exceeds a predetermined value.

2. In a radio echo detection system, which includes a cathode ray tube indicator and a push-pull driver stage adapted to deflect the electron beam of said cathode ray tube in accordance with the azimuthal rotation of the antenna of said system, apparatus for producing a movable azimuth marker line comprising, a first potentiometer having a movable arm which is adapted to follow the azimuthal rotation of said antenna and to supply said driver stage with an input signal, a second potentiometer, a relay, and a cam and switch arrangement attached to the shaft of said antenna in such a manner that when the azimuth rotation of said antenna exceeds a predetermined limit, said cam closes said switch, thus operating said relay to change the input to said driver stage from said first potentiometer to said second potentiometer.

3. In a radio echo detection system indicator circuit, which includes a cathode ray tube indicator and a push-pull driver stage adapted to deflect the electron beam of said cathode ray tube in accordance with the azimuthal rotation of the antenna of said system, apparatus for producing a movable azimuth marker line comprising, a first potentiometer having a movable arm which is adapted to follow the azimuthal rotation of said antenna and to supply said driver stage with an input signal, an operator controlled potentiometer, a relay adapted to change the input to said driver stage from said first potentiometer to said operator controlled potentiometer, and means for actuating said relay when the azimuth rotation of said antenna exceeds a predetermined limit.

4. In a radio echo detection system indicator circuit, which includes a cathode ray tube indicator and a push-pull driver stage adapted to deflect the electron beam of said cathode ray tube in accordance with the azimuthal rotation of the antenna system, apparatus for producing a movable azimuth marker line comprising, a first potentiometer having potentials of equal magnitude and opposite polarity applied to the respective ends thereof, said first potentiometer having a movable arm adapted to follow the azimuthal rotation of said antenna and to supply said driver stage with an input signal, an operator controlled potentiometer having potentials of opposite polarity applied to the ends thereof, a relay connected to the movable arms of said first and said operator controlled potentiometers, and means for actuating said relay to change the input to said driver stage from said first potentiometer to said operator controlled potentiometer when the azimuth rotation of said antenna exceeds a predetermined limit.

5. Apparatus for producing a marker on the indicator of a radio echo detection system comprising, means operable by the rotation of the antenna of said system for applying a first signal to said indicator, means for producing a second signal, and means for applying said second signal instead of said first signal to said indicator when the rotation of said antenna exceeds a predetermined limit.

6. Apparatus for producing a movable marker on the indicator of a radio echo detection system comprising, means operable by the rotation of the antenna of said system for applying a first signal to said indicator, operator controlled means for producing a second signal, and switching means for applying said second signal instead of said first signal to said indicator when the rotation of said antenna exceeds a predetermined limit.

7. Apparatus for producing a movable marker on the indicator of a radio echo detection system comprising, means operable by the rotation of the antenna of said system for applying a first signal to said indicator, operator controlled means for producing a second signal and switching means operable by said first signal for applying said second signal instead of said first signal to said indicator when said first signal exceeds a predetermined value.

8. Apparatus for producing a movable azimuth marker on the indicator of a radio echo detection system comprising, means operable by the rotation of the antenna of said system for applying a first signal to said indicator, operator controlled means for producing a second signal, and switching means operable by a cam on the shaft of said antenna for applying said second signal instead of said first signal to said indicator when the rotation of said antenna exceeds a predetermined limit.

LELAND J. HAWORTH.

REFERENCES CITED

The following references are of record in the file of this patent:

UNITED STATES PATENTS

| Number | Name | Date |
| --- | --- | --- |
| 2,121,359 | Luck et al. | June 21, 1938 |
| 2,178,074 | Jakel et al. | Oct. 31, 1939 |
| 2,233,275 | Wolff | Feb. 25, 1941 |
| 2,243,234 | Von Duhn | May 27, 1941 |
| 2,355,363 | Christaldi | Aug. 8, 1944 |